Oct. 27, 1942.  A. R. REMMERS  2,300,360
COLOR SELECTING CHART
Filed Sept. 6, 1940  2 Sheets-Sheet 1
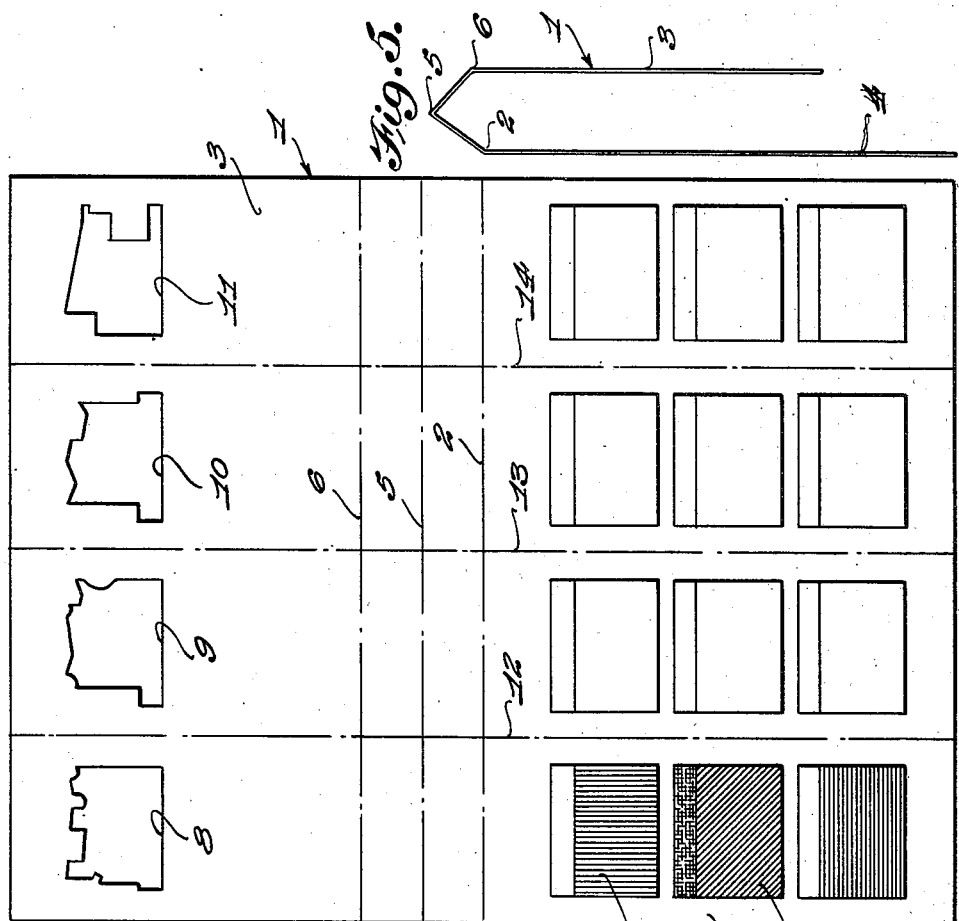
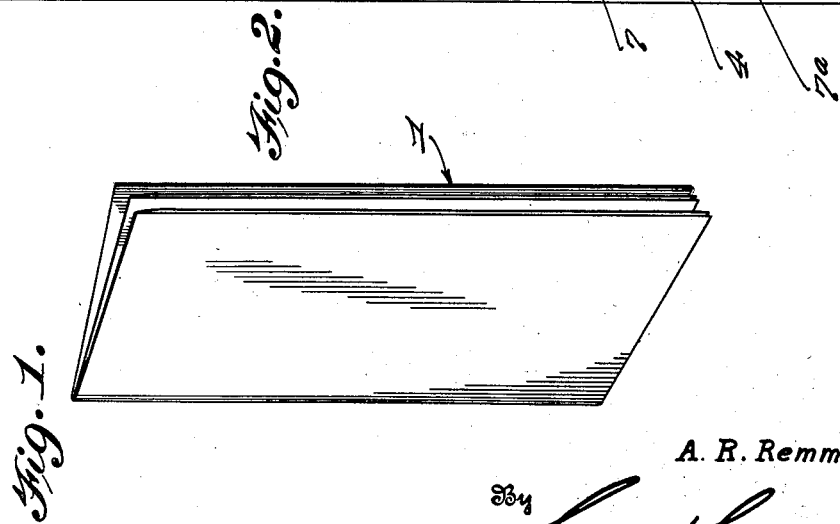
Inventor
A. R. Remmers.
By Lacey & Lacey, Attorneys

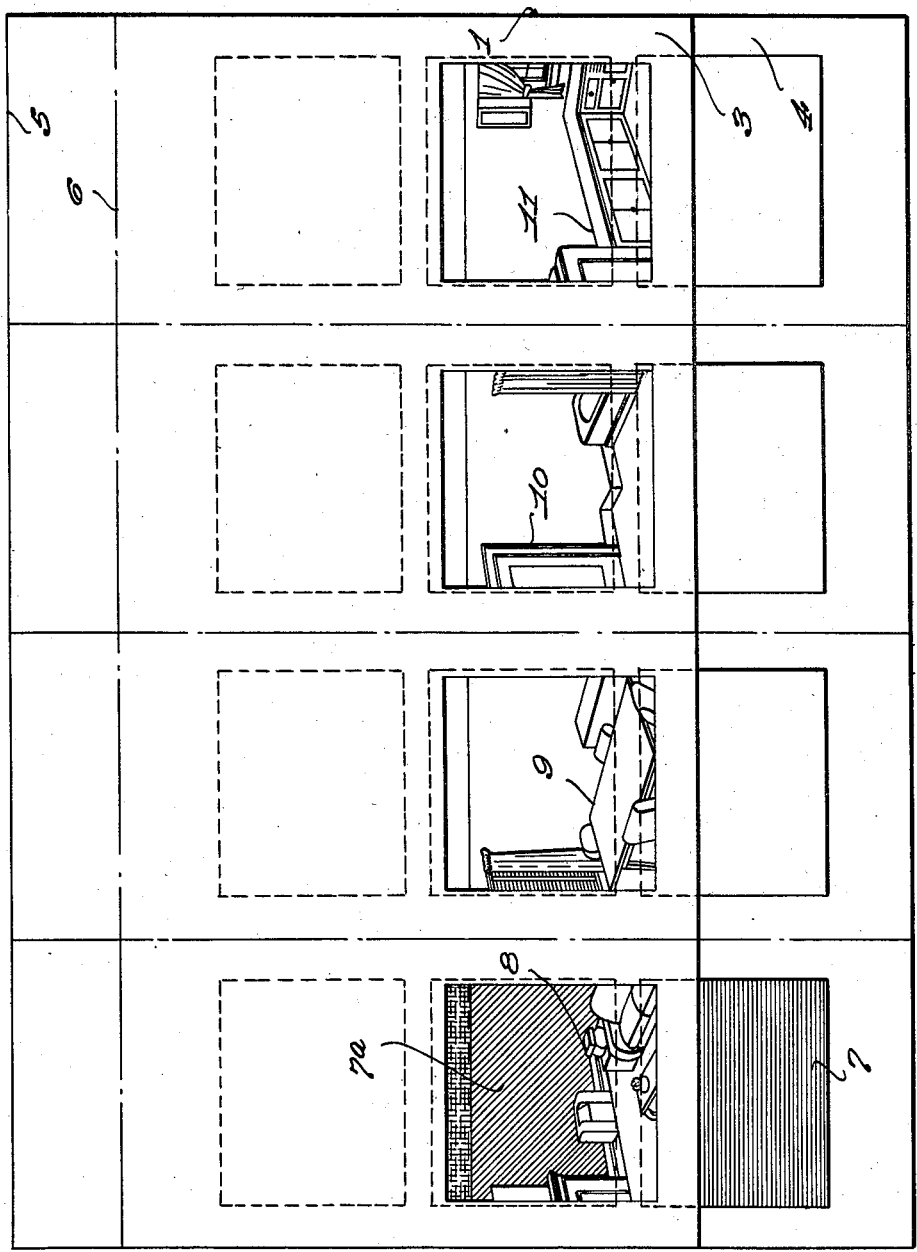

Patented Oct. 27, 1942

2,300,360

UNITED STATES PATENT OFFICE 2,300,360

COLOR SELECTING CHART

August R. Remmers, Louisville, Ky.

Application September 6, 1940, Serial No. 355,686

3 Claims. (Cl. 35—53)

This invention relates to an improved color selecting chart and more particularly to a chart for aiding in the selection of the color or colors of paint to be used for decorating interiors.

One object of the invention is to provide a color selecting chart which is adjustable so that it may be quickly changed for showing the effect of varied color combinations in a room.

Another object of the invention is to provide a chart of this character which may be folded to convenient size so that it may be readily placed in a coat pocket.

A further object of the invention is to provide a color selecting chart which may be manufactured in large quantities at low cost.

Still another object of the invention is to provide a color selecting chart having cut-outs for lending a furnished appearance to the lower portions of typical rooms, said cut-outs having open upper portions to be filled in by color chips for defining the walls and ceilings of the rooms.

Other objects of the invention will become apparent during the course of the following description.

In the drawings:

Figure 1 is a perspective view showing my improved color selecting chart as it would appear folded to a size convenient for carrying in a pocket, Figure 2 is a plan view of the color selecting chart as it would appear before being folded to a color selecting position, Figure 3 is an edge view of the color selecting chart in one of its operative positions, Figure 4 is a front elevation of the color selecting chart, in the position shown in Figure 3, and Figure 5 is an edge view showing the color selecting chart after the same has been partly folded.

Referring now more particularly to the accompanying drawings, the numeral 1 indicates the body of my improved color selecting chart. The body 1 is formed of a medium weight of highly finished paper. It should be understood, of course, that the device may be formed of paper or cardboard of any suitable weight. The body 1 is substantially square in shape and is provided with a medially and transversely disposed fold line 2 which defines sections 3 and 4. For the sake of convenience, the section 3 shall be designed as the upper section and the section 4 the lower section. The body is formed with fold lines 5 and 6 which are disposed parallel with respect to the fold line 2, on the upper section 3, and are located in horizontally equally spaced relation. The purpose of these fold lines on the upper section 3 will be brought out in more detail hereinafter.

Adhesively or otherwise suitably secured to the upper surface of the lower section 4 of the body 1 are color chips 7. The color chips are arranged in vertically and horizontally spaced series. More specifically, I have shown twelve of the color chips 7. These color chips are arranged in four vertical series of three chips each. The color chips 7 are preferably square in shape and are each lined to disclose two colors. A typical one of the color chips 7 is shown at 7ª, and by referring to this typical color chip, it will be seen that substantially four-fifths of the surface of the chip is lined for green. The remaining fifth of the surface, which is at the top, is lined for yellow or gold.

The upper section 3 of the body 1 is formed, throughout its outermost portion, with cut-outs 8, 9, 10 and 11. As seen in Figure 1, the cut-outs are arranged in alinement with the chips 7. That is to say, one of the cut-outs is alined with each series of three vertically arranged color chips. By referring to Figure 4 of the drawings, it will be seen that these cut-outs are shaped and colored to represent the furnishings of typical rooms of a house. The cut-out 8, for example, has been made to represent the interior of a living room. The cut-out 9 has been shaped to represent the interior of a den or office. A bath room is represented by the cut-out 10 and a kitchen by the cut-out 11.

When it is desired to show the effect of different colors on various rooms of a house, with my improved color selecting chart, it is only necessary to fold the upper section 3 into overlying relation with the lower section 4 to such a position that the cut-outs will be superposed upon certain of the color chips 7. When the cut-outs are superposed upon the color chips, the color chips will form a background for the furnishings represented by the cut-outs in such a manner that said color chips will lend the appearance of walls and a ceiling for the rooms. In more detail, it is desired to state that the fold lines 5 and 6 are spaced on the section 3 in such a manner that, when the section 3 is folded on the line 6, to overlie the section 4, the cut-outs 8, 9, 10 and 11 will be caused to overlie the uppermost horizontal series of four chips on the section 4. Should there be no combination of colors in this series of chips which would suit a prospective customer, the section 3 may be lifted from the section 4 and folded on the fold line 5. When this is done, as shown in Figure 4, the cut-outs 8, 9, 10 and 11 will be brought into registration with the second or middle series of 4 horizontally arranged color chips with the result that different color combinations for the walls and ceilings of the various rooms represented by the cut-outs will be shown. Should there be no desirable color combination represented by the chips in the middle series, it is only necessary for the demonstrator or dealer to raise the section 3 from the section 4 slightly and fold again on the medial fold line 2. That is to say, the cut-outs 8, 9, 10 and 11 will be disposed in overlying registration with the color chips of the lowermost series.

It is obvious that a large number of colors or combination of colors may be represented by the color chips. It will also be obvious that, should it be desirable, the body 1 may be made of such size that a large number of color chips may be placed on the lower section 4. It should be understood that, should there be more than three horizontally arranged series of chips, it will be necessary to provide additional fold lines, one of said fold lines being necessary for each horizontally arranged set of color chips. In addition, it is desired to state that, while I have shown four cut-outs, representing the furnished interiors of four rooms, the device may be enlarged to disclose any number of cut-outs.

When it is desired to fold the device to the convenient size shown in Figure 1, the section 3 is folded on the fold line 2 to overlie the section 4. The initially folded body is then again folded on vertically arranged fold lines 12, 13 and 14. That is to say, the device is first folded on the fold line 13 and is again folded on the fold lines 12 and 14, said fold lines overlying each other after the body has been folded on said fold line 13.

It is believed that it will be understood that, in this invention, a simple and highly efficient color selecting chart has been devised. The device is one which may be manufactured cheaply and in large quantities, for free distribution if desired.

The improved color selecting chart forming the subject-matter of this invention provides an extremely simple and effective means whereby color combinations may be attractively displayed. In other words, by the use of the device, a prospective customer may see how a certain color, or combination of colors, would appear on the walls of typical rooms.

Having thus described the invention, what is claimed as new is:

1. A color selecting chart including a body having a horizontal medially disposed fold line defining a pair of sections, color chips secured to one of the sections, the other of said sections being formed with a series of horizontally arranged cut-outs, and additional horizontal fold lines on said second mentioned section and being disposed in parallel spaced relation to each other and to said first-mentioned fold line near said first-mentioned fold line, said color chips being arranged in vertical alinement with the cut-outs and in horizontally and vertically arranged series, said last mentioned section being foldable on one of said fold lines for disposing the cut-outs in registration with one of the horizontally arranged series of color chips, said last mentioned section also being foldable selectively on the other fold lines for disposing the cut-outs in registration with the other horizontally arranged series of color chips, said cut-outs cooperating with the color chips for displaying colors through the cut-outs.

2. A color selecting chart as recited in claim 1, wherein vertically arranged laterally spaced fold lines are arranged on the sections for permitting folding of the chart to a more convenient size.

3. A color selecting chart including a body having a horizontal medially disposed fold line defining a pair of sections, color chips secured to one of said sections and being arranged in a vertically spaced series, the other of said sections being formed with cut-outs also arranged in a vertically spaced series, and additional horizontally disposed vertically spaced fold lines on said second-mentioned section and being disposed in parallel spaced relation to each other and to said first-mentioned fold line near said first-mentioned fold line, said color chips being arranged in vertical alinement with the cut-outs, said last-mentioned section being foldable on one of said fold lines for disposing one of the cut-outs in registration with one of the chips of the series of color chips, said last-mentioned section also being foldable selectively on the other fold line for disposing the cut-outs in registration with the other color chips, said cut-outs cooperating with the color chips for displaying colors through the cut-outs.

AUGUST R. REMMERS.